United States Patent
Cairns (10) Patent No.: US 12,184,028 B2
(45) Date of Patent: Dec. 31, 2024

(54) APPARATUS AND METHOD FOR GENERATING 780 NM ULTRASHORT-PULSED LASER RADIATION

(71) Applicant: Coherent Scotland Limited, Glasgow (GB)

(72) Inventor: Lee Cairns, Bearsden (GB)

(73) Assignee: Coherent Scotland Limited, Glasgow (GB)

( * ) Notice: Subject to any disclaimer, the term of this patent is extended or adjusted under 35 U.S.C. 154(b) by 667 days.

(21) Appl. No.: 17/473,769

(22) Filed: Sep. 13, 2021

(65) Prior Publication Data

US 2022/0085564 A1  Mar. 17, 2022

(30) Foreign Application Priority Data

Sep. 14, 2020 (GB) ...................... 2014402

(51) Int. Cl.
*H01S 3/00* (2006.01)
*H01S 3/067* (2006.01)
(Continued)

(52) U.S. Cl.
CPC .......... *H01S 3/0057* (2013.01); *H01S 3/0092* (2013.01); *H01S 3/06716* (2013.01);
(Continued)

(58) Field of Classification Search
CPC .... H01S 3/2308; H01S 3/0092; H01S 3/0057; H01S 3/1608
See application file for complete search history.

(56) References Cited

U.S. PATENT DOCUMENTS 6,882,466 B1 * 4/2005 Shimojoh ........... H01S 3/06758
359/341.33
8,311,065 B2 * 11/2012 Tsai ..................... H01S 3/07
372/6
(Continued)

FOREIGN PATENT DOCUMENTS

DE  102004009068 A1 *  9/2004 ............. G02F 1/383
EP  2194621 A2  6/2010
(Continued)

OTHER PUBLICATIONS

Choi et al., (2001). "High-Gain Coefficient Long-Wavelength-Band Erbium-Doped Fiber Amplifier Using 1530-nm Band Pump," IEE Photonics Technology Letters, 13(2):109-111.
(Continued)

*Primary Examiner* — Joshua King
(74) *Attorney, Agent, or Firm* — Morrison & Foerster LLP (57) ABSTRACT

An erbium fiber laser produces a beam of ultrashort laser pulses having a center wavelength greater than 780 nanometers, an average power greater than 0.5 watt, and a pulse duration less than 200 femtoseconds. The fiber laser includes an erbium fiber amplifier that is energized by a pump beam having a pump wavelength longer than 1520 nanometers. The pump wavelength is selected to provide uniform gain over the broad spectral bandwidth of a seed beam and minimal gain at shorter wavelengths in the fiber amplifier, thereby overcoming gain narrowing and gain shifting. The pump beam has sufficient power to achieve pump saturation in the fiber amplifier.

20 Claims, 5 Drawing Sheets (51) Int. Cl.
*H01S 3/094* (2006.01)
*H01S 3/16* (2006.01)
*H01S 3/23* (2006.01)

(52) U.S. Cl.
CPC ...... *H01S 3/094003* (2013.01); *H01S 3/1608* (2013.01); *H01S 3/1618* (2013.01); *H01S 3/2308* (2013.01); *H01S 3/0675* (2013.01)

(56) References Cited

U.S. PATENT DOCUMENTS

| | | | |
|---|---|---|---|
| 8,774,236 | B2 | 7/2014 | Ter-Mikirtychev |
| 9,634,454 | B1 | 4/2017 | Kieu et al. |
| 10,008,819 | B2 * | 6/2018 | Leonardo ............. H01S 3/0092 |
| 2003/0231380 | A1 * | 12/2003 | Gomes ............... H01S 3/06754 359/341.5 |
| 2004/0213302 | A1 | 10/2004 | Fermann et al. |
| 2008/0130102 | A1 * | 6/2008 | Murison ............. H04B 10/291 359/341.5 |
| 2011/0268140 | A1 * | 11/2011 | Keaton ............. H01S 3/094003 372/3 |
| 2011/0292498 | A1 * | 12/2011 | Chann ................. G03F 7/70033 359/341.1 |
| 2011/0306954 | A1 * | 12/2011 | Morin ............... H01S 3/094003 606/4 |
| 2012/0300290 | A1 * | 11/2012 | Kakui ................ B23K 26/0608 359/341.1 |
| 2013/0044768 | A1 | 2/2013 | Ter-Mikirtychev |
| 2014/0016184 | A1 * | 1/2014 | Laroche ............... H01S 3/2308 359/341.3 |
| 2015/0010036 | A1 * | 1/2015 | Salin ..................... H01S 3/0809 372/98 |
| 2015/0253645 | A1 * | 9/2015 | Coddington ........ H01S 3/06712 359/328 |
| 2016/0028204 | A1 | 1/2016 | Tu et al. |
| 2017/0063018 | A1 * | 3/2017 | Starodoumov ....... H01S 3/1106 |
| 2018/0109064 | A1 * | 4/2018 | Kanskar ............. H01S 3/06729 |
| 2018/0233878 | A1 * | 8/2018 | Leonardo ................ H01S 3/302 |
| 2018/0261969 | A1 * | 9/2018 | Augst ................. H01S 3/10023 |
| 2020/0194959 | A1 * | 6/2020 | Friedenauer ........ H01S 3/06708 |
| 2021/0281036 | A1 * | 9/2021 | Delavaux .......... H01S 3/094007 |

FOREIGN PATENT DOCUMENTS

| | | | |
|---|---|---|---|
| WO | WO-2005081430 A2 * | 9/2005 | .......... H01S 3/0057 |
| WO | WO-2007127356 A2 | 11/2007 | |
| WO | WO-2020160415 A1 | 8/2020 | |

OTHER PUBLICATIONS

Elahi et al., (2017). "175 fs-long pulses from a high-power single-mode Er-doped fiber laser at 1550 nm," Optics Communications, 403:381-384.

International Search Report and Written Opinion received for International Patent Application No. PCT/GB2021/052149 mailed on Feb. 11, 2022, 14 pages.

Le Blanc, et al., (1996). "Gain-narrowing and gain-shifting of ultra-short pulses in Ti:sapphire amplifiers," Optics Communications, 131(4-6):391-398.

Lim et al., (2012). "High-energy, in-band pumped erbium doped fiber amplifiers," Optics Express, 20(17):18803-18818.

Lim et al., (2012). "Optimizing the pumping configuration for the power scaling of in-band pumped erbium doped fiber amplifiers," Optics Express, 20(13):13886-13895.

Liu et al., (2015). "High Power 780 nm Femtosecond Fiber Laser," CLEO: OSA Technical Digest, 2 pages.

Paschotta (2008). RP Photonics Encyclopedia "Erbium-Doped Gain Media," retrieved from <rp-photonics.com/erbium_doped_gain_media> Jun. 24, 2020, 8 pages.

Search Report received for United Kingdom Patent Application No. 2014402.8 dated Feb. 11, 2021, 2 pages.

Zhang et al., (2011). "Resonantly cladding-pumped Yb-free Er-doped LMA fiber laser with record high power and efficiency," Optics Express, 19(6):5574-5578.

* cited by examiner

APPARATUS AND METHOD FOR GENERATING 780 NM ULTRASHORT-PULSED LASER RADIATION

CROSS REFERENCE TO RELATED APPLICATIONS

This application claims priority to United Kingdom Patent Application No. 2014402.8, filed on Sep. 14, 2020, the entire disclosure of which is incorporated herein by reference.

TECHNICAL FIELD OF THE INVENTION

The present invention relates in general to generating ultrashort pulses of laser radiation. The invention relates in particular to generating laser radiation having pulse durations of less than 200 femtoseconds and wavelengths of about 780 nanometers.

DISCUSSION OF BACKGROUND ART

Lasers producing beams of ultrashort laser pulses at near-infrared wavelengths are the enabling technology for analytical techniques that use multi-photon excitation. Notably, two-photon and three-photon microscopy for in situ imaging of biological tissue. A fluorescent dye is added to a tissue sample. Two photons or three photons are simultaneously absorbed from a near-infrared laser beam to excite a dye molecule, which then fluoresces at a shorter wavelength. The laser beam is focused and the focus is scanned in three-dimensions through the tissue sample. The fluorescence is detected and measured to create a three-dimensional image of the sample. The high intensities required for multi-photon absorption confine the excitation to a relatively small volume in the tissue for high-resolution imaging. Excitation using near-infrared wavelengths provides the advantages of weak single-photon absorption for deep penetration into the tissue sample and weak scattering for low background noise.

Ultrashort-pulsed lasers that use titanium-doped sapphire crystals as the gain medium are the most common excitation source for multi-photon imaging. These lasers are often tunable in wavelength and are commercially available. For example, the mode-locked Chameleon™ Ultra laser, available from Coherent Inc. of Santa Clara, California. Ultrashort-pulsed fiber lasers, wherein the gain medium is an optical fiber having a glass core doped with rare-earth ions, are an emerging alternative excitation source for multi-photon imaging. For example, glass doped with neodymium ($Nd^{3+}$), ytterbium ($Yb^{3+}$), or erbium ($Er^{3+}$) ions. Fiber lasers can be made more compact and are potentially less expensive than titanium sapphire lasers.

Erbium ions in fused silica glass can provide laser radiation over a broad range of wavelengths, with a gain peak around 1535 nanometers (nm), but extending from below 1480 nm to above 1600 nm. This broad gain spectrum can support mode-locked lasing and ultrashort pulses having pulse durations of hundreds of femtoseconds. The ultrashort pulses can be efficiently frequency doubled in a nonlinear crystal. For example, laser radiation at the highest-gain wavelengths between 1520 nm and 1570 nm can be frequency doubled to wavelengths between 760 nm and 785 nm in beta barium borate ($BaB_2O_4$) or lithium niobate ($LiNbO_3$) crystals. This wavelength range provides access to Sapphire and CFP, which are two fluorescent proteins commonly used for two-photon excitation.

For analytical techniques that require high pulse energies above 1 millijoule (mJ), such as time-resolved spectroscopy and multi-dimensional spectroscopy, titanium sapphire is still the only practical gain medium. A problem when scaling the power of titanium sapphire amplifiers is described in "Gain-narrowing and gain-shifting of ultra-short pulses in Ti:sapphire amplifiers" by Le Blanc et al. in *Optics Communications*, volume 131, 1996, pages 391-398. Gain narrowing and gain shifting occur when broad-bandwidth laser radiation is amplified in multi-pass and regenerative amplifier arrangements. Gain narrowing occurs because laser radiation at wavelengths closest to the gain peak at 800 nm are preferentially amplified. Gain shifting occurs because the gain spectrum is asymmetrical about the gain peak, having higher gain cross-sections at longer wavelengths. Spectrally-selective losses can be incorporated into the amplifier to reshape the effective gain spectrum, but such losses reduce efficiency and increase complexity.

SUMMARY OF THE INVENTION

FIG. 2 in Le Blanc illustrates that for an input bandwidth of 50 nm (FWHM $Sech^2$), maximum gain narrowing in titanium sapphire occurs for an input center wavelength between 800 nm and 860 nm, while gain shifting reduces as the input center wavelength increases. There is a compromise between gain narrowing and spectra shifting for an input beam having a center wavelength of about 780 nm. A fiber laser providing broad-bandwidth laser radiation that has about equal spectral content above and below 780 nm would be a relatively simple and cost-effective seed source for a titanium sapphire amplifier in a high-energy laser system producing femtosecond pulses.

In ultrashort-pulsed erbium fiber lasers, gain narrowing favors amplification at shorter wavelengths within the gain band between 1520 nm and 1570 nm, due to the strong gain peak in erbium-doped glass at about 1535 nm. Even so, after frequency doubling, the proteins Sapphire and CFP are still accessible for two-photon excitation. Another common fluorescent protein mCerulean has weak two-photon absorption cross-section below 780 nm, but the cross-section increases rapidly with wavelength above 780 nm. An ultrashort pulsed excitation source that provides significant spectral content above 780 nm could excite all three of these proteins, without the additional complexity and cost for wavelength tunability.

There is need for ultrashort-pulsed lasers that generate spectrally-broad output laser radiation having a center wavelength of at least 780 nm. Preferably, the laser radiation would have an average power of at least 0.5 watt (W), and more preferably greater than 1 W. Preferably, the laser radiation would have a compressed pulse duration less than 200 femtoseconds (fs), and more preferably less than 150 fs.

In one aspect, an ultrashort-pulsed laser in accordance with the present invention comprises a seed laser for generating a pulsed signal beam and an optical resonator for generating a pump beam, which has a pump wavelength greater than or equal to 1520 nm. A power amplifier doped with erbium ions is arranged to receive the signal beam from the seed laser and the pump beam from the optical resonator. The erbium ions in a gain volume of the power amplifier are energized by the pump beam. The pump beam causes pump saturation and produces a population inversion within the gain volume less than or equal to 57%. The power amplifier generates an amplified signal beam. A pulse compressor temporally compresses pulses in the amplified signal beam. A harmonic generator is arranged to receive the amplified and compressed signal beam. The harmonic generator generates a second-harmonic beam having a center wavelength greater than or equal to 780 nm and a pulse duration less than or equal to 200 fs.

In another aspect, a method for generating an output laser beam in accordance with the present invention comprises the steps of generating a pulsed signal beam and generating a pump beam having a pump wavelength greater than or equal to 1520 nm. The signal beam and the pump beam are delivered to a power amplifier doped with erbium ions. The pump beam energizes the erbium ions in a gain volume of the power amplifier, causing pump saturation and producing a population inversion within the gain volume less than or equal to 57%. The power amplifier generates an amplified signal beam. The method further comprises the steps of temporally compressing pulses in the amplified signal beam and converting the amplified and compressed signal beam to the output laser beam by second-harmonic generation. The output laser beam has a center wavelength greater than or equal to 780 nm and a pulse duration less than or equal to 200 fs.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
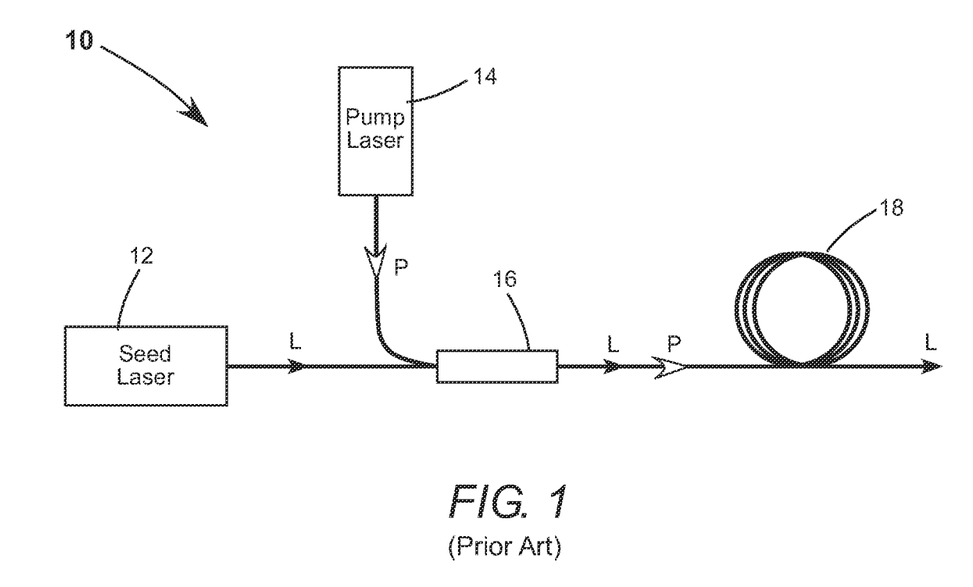
FIG. 1 is a block diagram schematically illustrating a prior-art fiber laser including a seed laser generating a laser beam, a pump laser generating a pump beam, and a fiber amplifier energized by the pump beam and amplifying the laser beam.

Referring now to the drawings, wherein like components are designated by like numerals, FIG. 1 schematically illustrates a prior-art fiber laser 10 for generating and amplifying an ultrashort-pulsed laser beam, using an erbium-doped optical fiber as gain media. Fiber laser 10 includes a seed laser 12 that generates a beam of pulsed laser radiation L having a broad spectral bandwidth. Fiber laser 10 further includes a pump laser 14 generating a beam of pump radiation P, which is delivered through a beam combiner 16 into a fiber amplifier 18. Pump beam P energizes erbium ions within fiber amplifier 18. Beam combiner 16 also delivers laser beam L into fiber amplifier 18, wherein laser beam L is amplified, with a typical gain of tens or hundreds of decibels.

Figure 2:
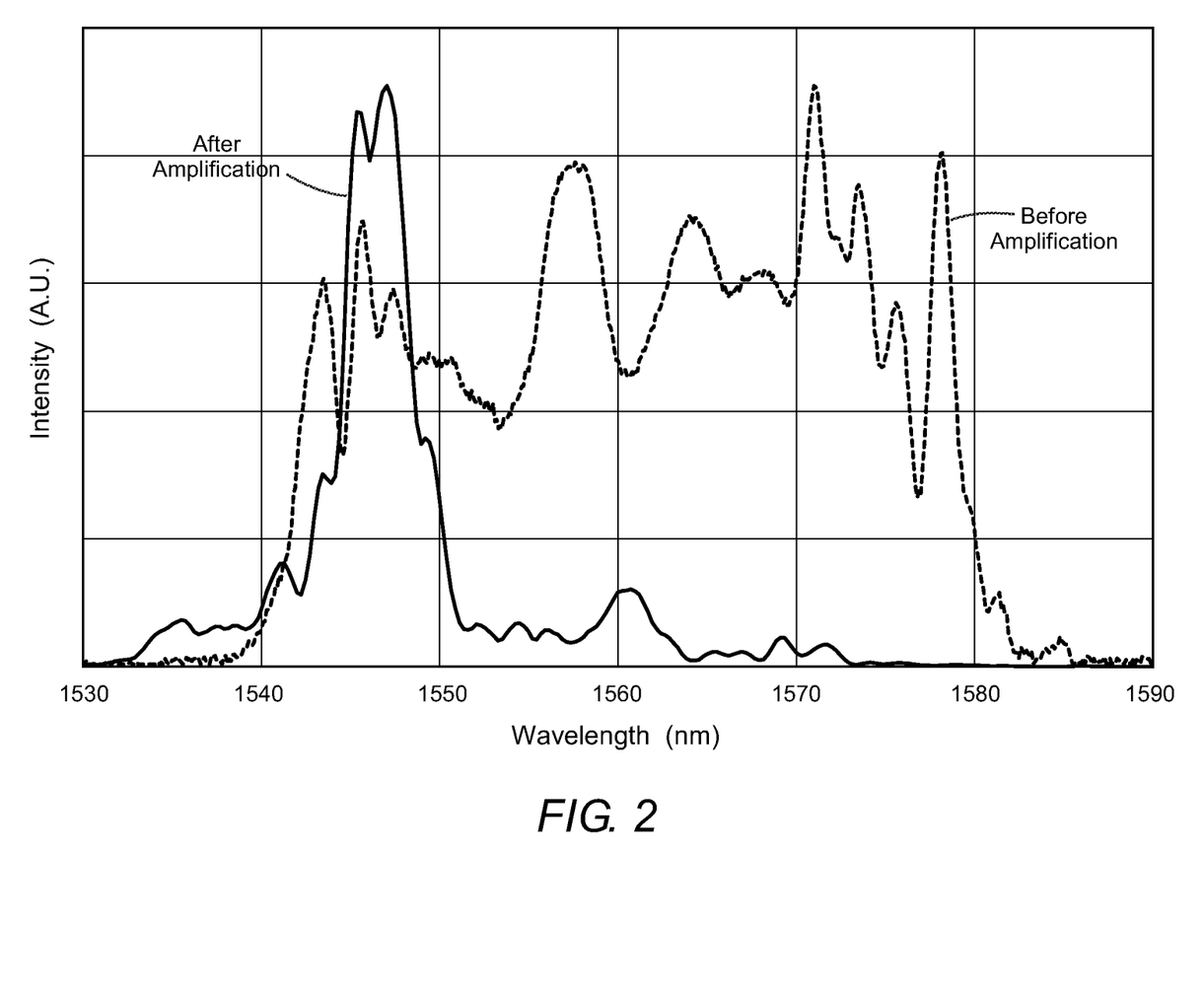
FIG. 2 is a graph schematically illustrating measured intensity vs. wavelength of a laser beam before amplification and after amplification in an example of the fiber laser of FIG. 1.

FIG. 2 is a graph schematically illustrating measured intensity of laser beam L vs. wavelength in an example of prior-art fiber laser 10. Intensity was measured prior to amplification and after amplification in fiber amplifier 18. Prior to amplification, the spectrum of laser beam L generated by seed laser 12 has power distributed between about 1540 nm and about 1580 nm. Although the spectrum has some structure, overall, the power distribution is relatively uniform. The full-width-at-half-maximum (FWHM) bandwidth is about 34 nm. After amplification, the spectrum of amplified laser beam L is narrower, having significantly more power between 1540 nm and 1550 nm than between 1550 nm and 1580 nm. Essentially, the spectrum is a peak, located at about 1546 nm and having a FWHM bandwidth of about 4 nm. This undesirable spectral narrowing is an example of the gain narrowing discussed above, caused in fiber amplifier 18 by the strong gain peak in erbium-doped glass at about 1535 nm.

Figure 3:
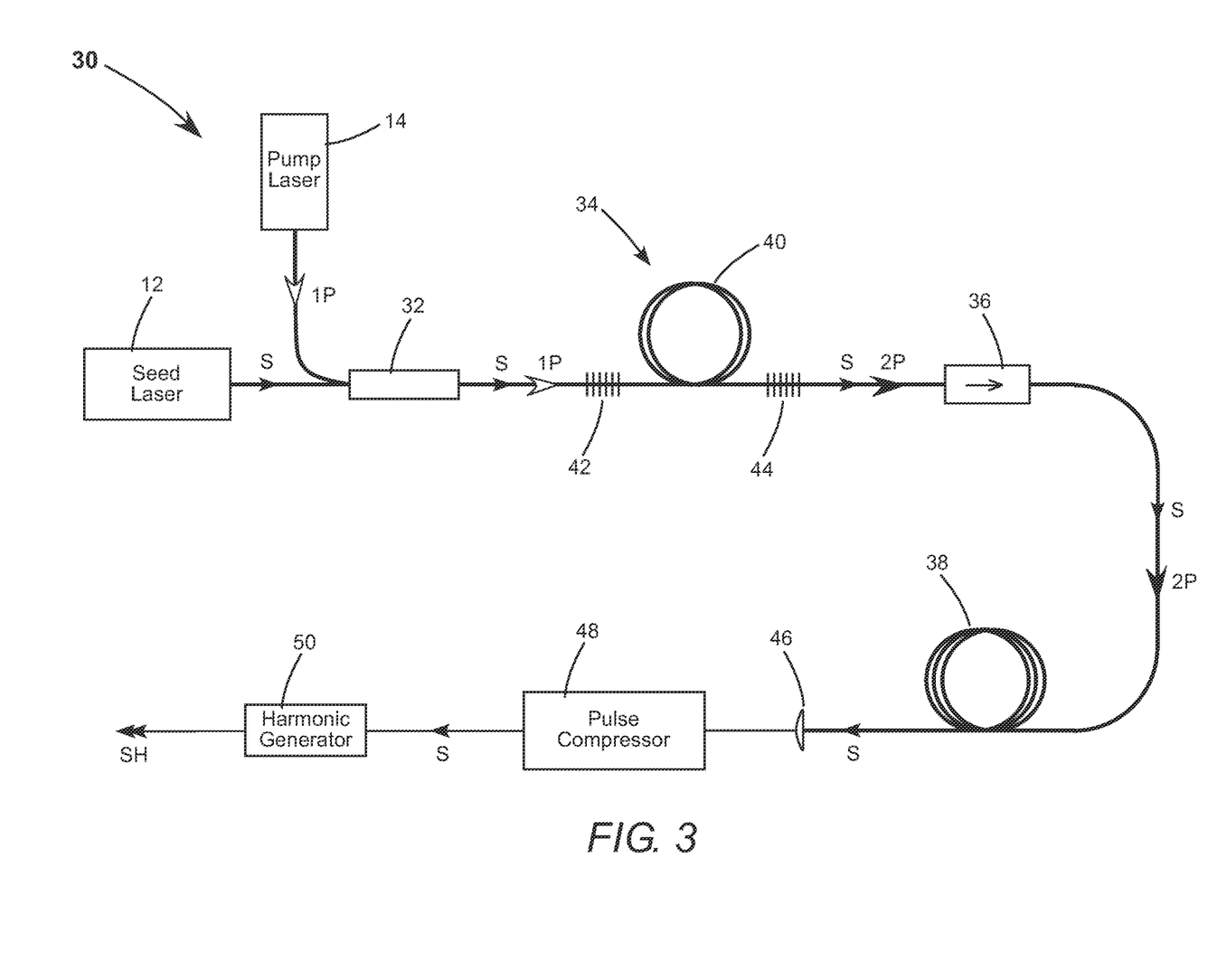
FIG. 3 is a block diagram schematically illustrating one preferred embodiment of an erbium fiber laser in accordance with the present invention for generating a beam of pulsed laser radiation, including a seed laser generating a signal beam, a pump laser generating a first pump beam, an optical resonator generating a second pump beam, a transmissive beam combiner, a power amplifier energized by the second pump beam and amplifying the signal beam, a pulse compressor, and a harmonic generator generating a second-harmonic beam.

FIG. 3 schematically illustrates one preferred embodiment of a fiber laser 30 in accordance with the present invention. Fiber laser 30 includes seed laser 12 for generating a signal beam of pulsed laser radiation S, indicated in the drawings by small single-headed arrows, which has a broad spectral bandwidth. Signal beam S propagates through a transmissive beam combiner 32, an optical resonator 34, an optional optical isolator 36, and into a power amplifier 38. Optical resonator 34 includes an optical gain fiber 40, a high-reflection mirror 42, and an output-coupling mirror 44. Optical gain fiber 40 has a core doped with erbium ($Er^{3+}$) ions that are energized by a first pump beam 1P, indicated in the drawings by large open single-headed arrows. The optical gain fiber may also be co-doped with sensitizing ions, such as ytterbium ($Yb^{3+}$), that efficiently absorb first pump beam 1P and transfer the absorbed pump energy to the erbium ions. First pump beam 1P has a wavelength that is strongly absorbed by the dopant ions. First pump beam 1P is generated by pump laser 14, which could be a diode laser or diode laser assembly. By way of example, diode lasers are commercially available at 920 nm and 976 nm, which can be used for pumping ytterbium co-doped gain fibers. First pump beam 1P is delivered via beam combiner 32 into optical gain fiber 40, wherein it co-propagates with signal beam S.

High-reflection mirror 42 and output-coupling mirror 44 are, here, fiber Bragg gratings that define each end of optical resonator 34. High-reflection mirror 42 is transmissive for signal beam S and first pump beam 1P, but is highly reflective at a pump wavelength of a second beam of pump radiation 2P, which is greater than or equal to 1500 nm. Output-coupling mirror 44 is transmissive for signal beam S and partially reflective for the second pump beam 2P. When energized, optical resonator 34 produces the second pump beam 2P at the pump wavelength, which is indicated in the drawings by large filled single-headed arrows. Signal beam S propagates through optical resonator 34 with minimal overall loss or some incidental gain. Signal beam S and second pump beam 2P co-propagate through optional optical isolator 36 into power amplifier 38. Optical isolator 36 could be included to protect optical resonator 34 and seed laser 12 against reflected and therefore counter-propagating amplified signal beams.

Power amplifier 38, here, includes a gain fiber having a core doped with erbium ions that are energized by second pump beam 2P. Power amplifier 38 generates an amplified signal beam S, with minimal spectral narrowing, as discussed below. Amplified signal beam S transitions from fiber-guided to free-space propagation, is collimated by a fiber collimator 46, and is directed thereby into a pulse compressor 48. Pulses in amplified signal beam S are temporally compressed to a shorter duration by pulse compressor 48. Amplified and compressed signal beam S is then directed into a harmonic generator 50, which generates a beam of second-harmonic laser radiation SH by harmonic generation in a quasi-phase-matched optically-nonlinear crystal. Second-harmonic beam SH is indicated in the drawings by small double-headed arrows. Optical isolation, pulse compression, and harmonic generation are well-known in the art, and further description thereof is not necessary for understanding the principles of the present invention.

Figure 4:
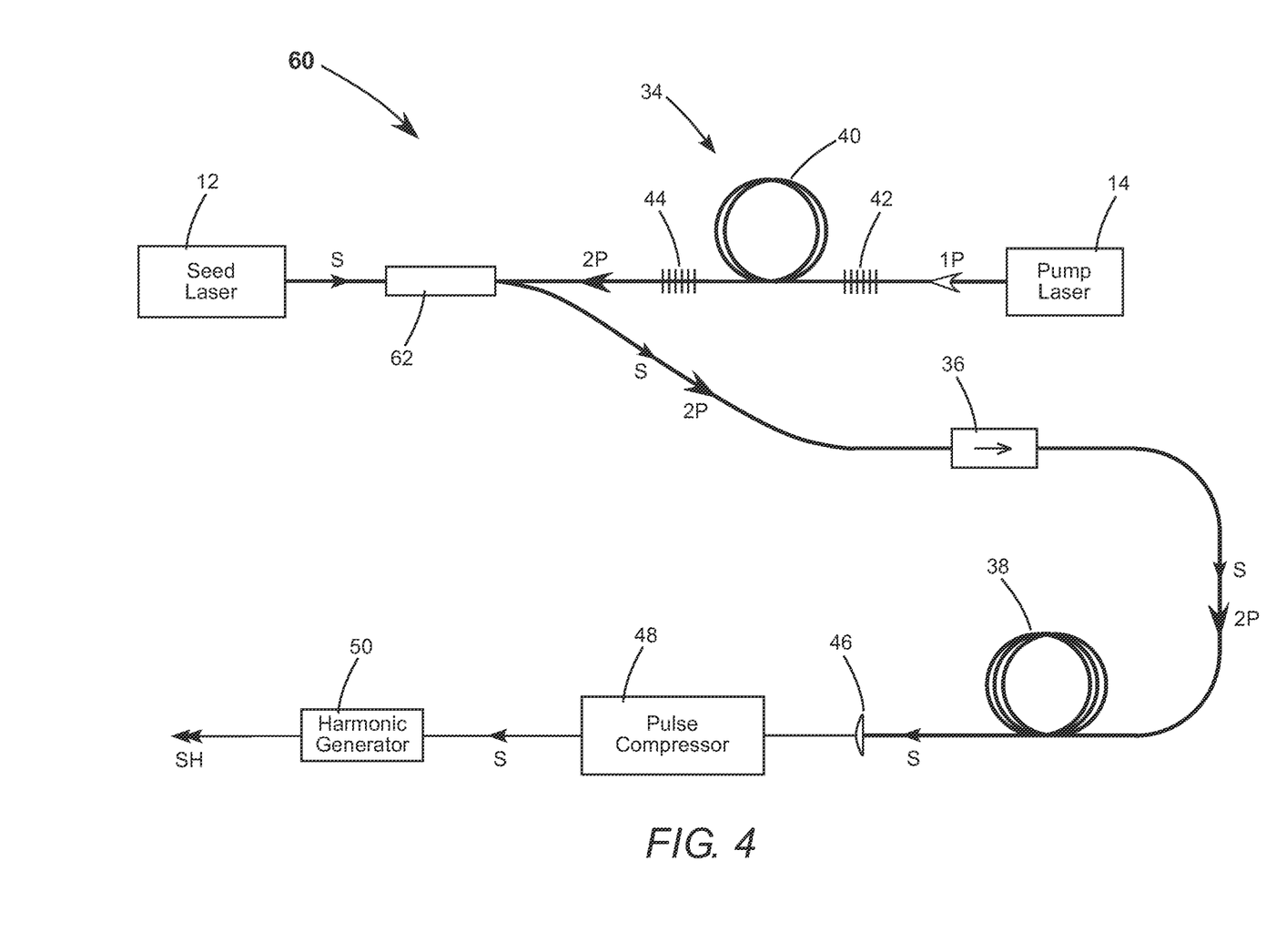
FIG. 4 is a block diagram schematically illustrating another preferred embodiment of an erbium fiber laser in accordance with the present invention, similar to the fiber laser of FIG. 3, but having a reflective beam combiner.

FIG. 4 schematically illustrates another preferred embodiment of a fiber laser 60 in accordance with the present invention. Fiber laser 60 is similar to fiber laser 30, but is arranged to avoid signal beam S propagating through optical resonator 34. First pump beam 1P is delivered directly from pump laser 14 through high-reflection mirror 42 into optical gain fiber 40. Optical resonator 34 generates second pump beam 2P, which propagates through output-coupling mirror 44 to a reflective beam combiner 62. Beam combiner 62 is transmissive for signal beam S and is reflective for second pump beam 2P. Second pump beam 2P energizes power amplifier 38 and signal beam S seeds generation of amplified signal beam S. Again, pulses in amplified signal beam S are temporally compressed to a shorter duration by pulse compressor 48. Second-harmonic beam SH is generated from amplified and compressed signal beam S in harmonic generator 50.

One advantage of this embodiment is that high-reflection mirror 42 and output-coupling mirror 44 are not constrained to be transmissive to signal beam S. Another advantage of this embodiment is that signal beam S does not propagate through any gain elements or resonator mirrors between seed laser 12 and power amplifier 38, which could otherwise modify the spectrum of signal beam S. Both fiber laser 30 and fiber laser 60 produce an amplified signal beam S having a broad spectral bandwidth, which ideally has an approximately uniform power distribution over the same spectral bandwidth that signal beam S had prior to amplification. The operation of the inventive fiber laser is explained next with reference to FIG. 5.

Figure 5:
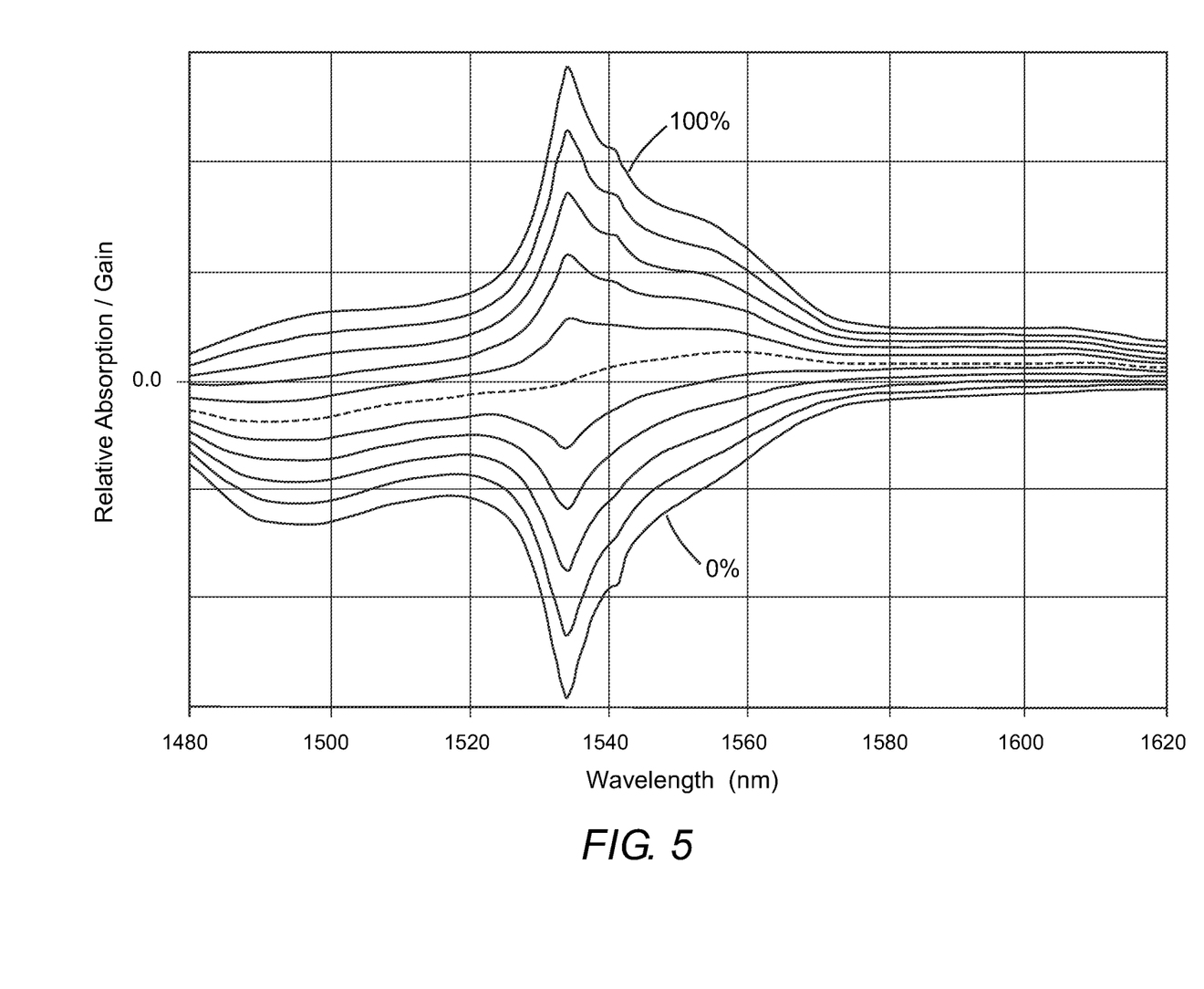
FIG. 5 is a graph schematically illustrating absorption or gain vs. wavelength for different population inversions in the power amplifier of FIGS. 3 and 4, which is made of an erbium-doped glass.

FIG. 5 is a graph schematically illustrating relative absorption and relative gain vs. wavelength of erbium-doped glass for different population inversions between 0% and 100%. Values less than zero on the vertical axis correspond to optical absorption and values greater than zero correspond to optical gain for a beam of radiation that is propagating in the glass. The graph was adapted from FIG. 3 of the online article "Erbium-Doped Gain Media" as it was presented on 24 Jun. 2020 in *RP Photonics Encyclopedia* (rp-photonics.com/erbium_doped_gain media).

Population inversion refers generally to the number of energized ions divided by the total number of ions, expressed as a percentage. Here, specifically, population inversion is the number of erbium ions in the $^4I_{13/2}$ excited state divided by the total number of erbium ions in the $^4I_{15/2}$ ground state and the $^4I_{13/2}$ excited state. A beam of radiation at the 1540 nm wavelength of the $^4I_{15/2} \leftrightarrow {}^4I_{13/2}$ transition would be absorbed if the population inversion is less than 50% and amplified if the population inversion is greater than 50%. The $^4I_{13/2}$ and $^4I_{15/2}$ energy states of erbium ions in glass are split by the crystal field into multiplets having a plurality of individual Stark energy levels. Additional inhomogeneous broadening further broadens the $^4I_{15/2} \leftrightarrow {}^4I_{13/2}$ transition. For example, the $^4I_{13/2} \rightarrow {}^4I_{15/2}$ emission transition has a $1/e^2$ intensity linewidth of approximately 100 nm at room temperature. Relative absorption and gain therefore depend on wavelength, as depicted in the drawing.

Optical resonator 34 of fiber lasers 30 and 60 is configured to generate a second pump beam 2P having the pump wavelength, which is greater than or equal to 1500 nm. The pump wavelength is controlled by selection of the spectral properties of high-reflection mirror 42 and output-coupling mirror 44. Specifically, the high-reflection mirror is highly reflective and the output-coupling mirror is partially reflective at the pump wavelength. For example, at a pump wavelength of 1535 nm.

Referring to FIG. 5, for a population inversion of about 50% (distinguished in the drawing by a dashed line), there is neither absorption nor gain in erbium-doped glass at the exemplary pump wavelength 1535 nm. The population inversion at this wavelength is essentially clamped at about 50%, meaning second pump beam 2P is absorbed until the population inversion reaches about 50% and then the energized erbium-doped glass becomes transparent. In this condition, absorption of second pump beam 2P that excites ground-state erbium ions is balanced by stimulated emission that relaxes the excited erbium ions, assuming other losses are negligible. If second pump beam 2P has the exemplary pump wavelength 1535 nm and has sufficient intensity in power amplifier 38 to reach this "pump saturation" condition, the 50% population inversion in FIG. 5 becomes the gain spectrum for signal beam S. Similarly, for a pump wavelength of 1530 nm, pump saturation corresponds to a population inversion of about 53%. For a pump wavelength of 1520 nm, pump saturation corresponds to a population inversion of about 57%. For a pump wavelength of 1540 nm, pump saturation corresponds to a population inversion of about 47%.

In pump saturation at the exemplary pump wavelength 1535 nm (dashed line in FIG. 5.), wavelengths less than 1535 nm in the spectrum of signal beam S are absorbed, while wavelengths greater than 1535 nm experience gain. There is a broad gain peak at about 1560 nm, which favors amplification of a signal beam having a broad spectral bandwidth and a center wavelength of about 1560 nm. By way of example, a signal beam having a spectral bandwidth greater than 30 nm, 35 nm, 40 nm, or even 45 nm. Ideally, the amplified signal beam would have the same bandwidth as the signal beam had prior to amplification, or nearly the same bandwidth. Herein, "center wavelength" refers to the arithmetic centroid wavelength in a spectrum.

The unamplified laser beam depicted in FIG. 2 has a FWHM bandwidth of about 34 nm and a center wavelength of about 1560 nm. Amplification of such a signal beam in power amplifier 38 of the inventive fiber laser would generate an amplified signal beam having nearly the same 34 nm bandwidth and, overall, would maintain a relatively uniform power distribution within that spectral bandwidth. The spectrum of the amplified signal beam would be modulated by the gain spectrum in power amplifier 38, which is relatively flat over the 34 nm spectral bandwidth about 1560 nm at 50% population inversion, as depicted in FIG. 5. This modulation would likely cause some spectral narrowing.

The unamplified laser beam depicted in FIG. 2 was first generated in a laser oscillator, which included an energized erbium-doped gain fiber, a semiconductor saturable absorber mirror (SESAM) for mode locking, and an output coupler. Pulses in the mode-locked laser beam were temporally stretched in a dispersive optical fiber, preamplified in another energized erbium-doped gain fiber, and spectrally broadened by self-phase modulation (SPM). Ultrashort pulses in a laser beam for seeding a power amplifier would normally be stretched to durations of tens of picoseconds, to prevent undesirable nonlinear processes in a subsequent power amplifier. The undulating structure overlaying the spectrum is caused by the SPM and is characteristic of output from an ultrashort-pulsed erbium fiber laser. Seed laser 12 would typically have such an arrangement and may include additional erbium fiber preamplifiers.

To mitigate gain narrowing in power amplifier 38 caused by the strong gain peak in erbium-doped glass at about 1535 nm, the pump wavelength should be greater than 1500 nm, corresponding to pump saturation at a population inversion of about 67%. The pump wavelength should also be less than about 1550 nm to be absorbed by the erbium ions, corresponding to pump saturation at a population inversion of about 42%. The pump wavelength can be selected according to the center wavelength and spectral bandwidth of the signal beam being amplified. For a center wavelength of about 1560 nm, the pump wavelength could be selected from a range between 1520 nm and 1540 nm. For higher signal gain and/or a broader bandwidth, the pump wavelength would preferably be selected from range between 1525 nm and 1537 nm, and more preferably from a range between 1530 nm and 1535 nm. A pump wavelength greater than or equal to 1530 nm produces pump saturation at a population inversion less than or equal to 53%. The center wavelength of the amplified signal beam has some dependence on the pump wavelength, because the spectrum thereof is modulated by the gain spectrum in the power amplifier.

It should be noted that an advantage of the inventive fiber laser is that when power amplifier 38 is in pump saturation, the gain spectrum thereof is invariant, which means the spectrum of amplified signal beam S is insensitive to small fluctuations in power of second pump beam 2P. In pump saturation, the gain spectrum of the power amplifier is determined only by the pump wavelength.

For a pump wavelength of 1535 nm, we calculated that a second-harmonic beam having a center wavelength greater than or equal to 780 nm can be generated by the inventive fiber laser having an average power greater than 1.0 W and a compressed pulse duration of less than 150 fs. A second-harmonic beam could be generated having a center wavelength of 780 nm, an average power greater than 0.5 W, and a compressed pulse duration of less than 200 fs using commercially-available fiber components. The pulse compressor would be optimized for operation at the signal wavelength of 1560 nm. The harmonic generator would have an optically-nonlinear crystal that is quasi phased matched for conversion of a signal wavelength 1560 nm to a second-harmonic wavelength 780 nm.

In summary, an erbium power amplifier is seeded by a broad bandwidth laser beam and energized by a pump beam that has a pump wavelength within the $^4I_{15/2} \rightarrow {}^4I_{13/2}$ absorption transition. The pump beam is generated in an optical resonator that operates at the pump wavelength, which is greater than or equal to 1520 nm, and is selected to clamp population inversion in the power amplifier to less than or equal to 57%. The pump beam intensity in the power amplifier is sufficient to achieve pump saturation, thereby providing gain within the spectral bandwidth of the laser beam and minimizing gain at shorter wavelengths. The power amplifier amplifies the laser beam, while maintaining a center wavelength greater than or equal to 1560 nm.

The amplified laser beam is temporally compressed and converted to an output laser beam by second-harmonic generation. The inventive laser produces an amplified laser beam with sufficient bandwidth and power to generate an output laser beam having a center wavelength greater than or equal to 780 nm, a compressed pulse duration less than or equal to 200 fs, and an average power greater than or equal to 0.5 W. The inventive laser is capable of producing an output laser beam having a center wavelength of about 780 nm, a compressed pulse duration less than 150 fs and/or an average power greater than 1.0 W.

The inventive fiber laser is more efficient than alternative designs that include spectral filtering elements within a power amplifier to flatten or shift a gain spectrum. Such spectral filtering necessarily adds optical losses and generates heat that must be removed from the power amplifier and ultimately extracted from a laser system. In contrast, the inventive fiber laser can utilize all the absorbed pump power to generate an amplified laser beam with power predominantly in the desired spectral bandwidth and distributed therein. Energizing the power amplifier at a pump wavelength longer than 1500 nm also generates considerably less waste heat than at a pump wavelength of about 920 nm or about 976 nm.

Although the power amplifier is a gain fiber having a core doped with erbium ions in the embodiments presented above, in other embodiments the power amplifier could be a bulk optic made of a crystal or glass doped with erbium ions. The bulk amplifier optic would be a single piece of crystal or glass that is cut, polished, and optically coated. The second pump beam would create an energized gain volume within the bulk amplifier optic. The second pump beam and/or the laser beam may be directed through this gain volume in a multi-pass arrangement, which overcomes the relatively low absorption and gain cross sections.

In a gain fiber, the gain volume is the erbium-doped core. The gain fiber does not need a pump cladding, since the second pump beam is already conveniently guided within a fiber core when delivered to the power amplifier. An inherent advantage of a gain fiber is a long interaction length for absorption of the second pump beam and amplification of the laser beam.

It should also be noted that the inventive fiber laser can generate the desired spectral bandwidths using a linear power amplifier. Alternative designs that use self-phase modulation in a nonlinear power amplifier to overcome gain narrowing have a disadvantage that large and unwanted changes in spectral bandwidth occur when there is need to change the power of the amplified laser beam. For example, to overcome component degradation. Large changes in spectral bandwidth necessitate realignment of the pulse compressor to maintain a target pulse duration and an acceptable temporal beam shape. Another disadvantage of a nonlinear power amplifier is generation of higher-order phase, which is difficult to compensate for in a pulse compressor. The fraction of the amplified power having higher-order phase is not compressed into a desired time-bandwidth limited pulse, effectively increasing the overall compressed pulse duration or equivalently reducing the fraction of the amplified power within the time-bandwidth limited pulse.

The present invention is described above in terms of a preferred embodiment and other embodiments. The invention is not limited, however, to the embodiments described and depicted herein. Rather, the invention is limited only by the claims appended hereto.

What is claimed is:

1. An ultrashort-pulsed laser, comprising:
a seed laser for generating a pulsed signal beam;
an optical resonator for generating a pump beam having a pump wavelength greater than or equal to 1520 nanometers;
a power amplifier doped with erbium ions, the power amplifier arranged to receive the signal beam from the seed laser and the pump beam from the optical resonator, the erbium ions in a gain volume of the power amplifier energized by the pump beam, the pump beam causing pump saturation and producing a population inversion within the gain volume less than or equal to 57%, the power amplifier generating an amplified signal beam;
a pulse compressor for temporally compressing pulses in the amplified signal beam; and
a harmonic generator arranged to receive the amplified and compressed signal beam, the harmonic generator generating a second-harmonic beam having a center wavelength greater than or equal to 780 nanometers and a pulse duration less than or equal to 200 femtoseconds.

2. The ultrashort-pulsed laser of claim 1, wherein the pump wavelength is in a range between 1525 nanometers and 1537 nanometers.

3. The ultrashort-pulsed laser of claim 2, wherein the pump wavelength is in a range between 1530 nanometers and 1535 nanometers.

4. The ultrashort-pulsed laser of claim 1, wherein the power amplifier is a gain fiber and the gain volume is a core of the gain fiber.

5. The ultrashort-pulsed laser of claim 1, wherein the power amplifier is a bulk optic made of a crystal or glass doped with erbium ions.

6. The ultrashort-pulsed laser of claim 1, wherein the second-harmonic beam has a pulse duration less than 150 femtoseconds.

7. The ultrashort-pulsed laser of claim 1, wherein the second-harmonic beam has an average power greater than or equal to 0.5 watt.

8. The ultrashort-pulsed laser of claim 7, wherein the second-harmonic beam has an average power greater than 1 watt.

9. The ultrashort-pulsed laser of claim 1, wherein the signal beam generated by the seed laser has a center wavelength greater than or equal to 1560 nanometers.

10. The ultrashort-pulsed laser of claim 1, wherein the signal beam generated by the seed laser has a spectral bandwidth greater than 30 nanometers.

11. The ultrashort-pulsed laser of claim 1, wherein the amplified signal beam generated by the power amplifier has a center wavelength greater than or equal to 1560 nanometers.

12. The ultrashort-pulsed laser of claim 1, wherein the amplified signal beam generated by the power amplifier has a spectral bandwidth greater than 30 nanometers.

13. A method for generating an ultrashort-pulsed output laser beam, comprising the steps of:
generating a pulsed signal beam;
generating a pump beam in an optical resonator, the pump beam having a pump wavelength greater than or equal to 1520 nanometers;
delivering the signal beam and the pump beam to a power amplifier doped with erbium ions, the pump beam energizing the erbium ions in a gain volume of the power amplifier, causing pump saturation and producing a population inversion within the gain volume less than or equal to 57%, the power amplifier generating an amplified signal beam;
temporally compressing pulses in the amplified signal beam; and
converting the amplified and compressed signal beam to the output laser beam by second-harmonic generation, the output laser beam having a center wavelength greater than or equal to 780 nanometers and a pulse duration less than or equal to 200 femtoseconds.

14. The method of claim 13, wherein the pump wavelength is in a range between 1525 nanometers and 1537 nanometers.

15. The method of claim 14, wherein the pump wavelength is in a range between 1530 nanometers and 1535 nanometers.

16. The method of claim 13, wherein the pump beam produces a population inversion within the gain volume less than or equal to 53%.

17. The method of claim 13, wherein the amplified signal beam generated by the power amplifier has a spectral bandwidth greater than 30 nanometers.

18. The method of claim 13, wherein the output laser beam has a pulse duration less than 150 femtoseconds.

19. The method of claim 13, wherein the output laser beam has an average power greater than or equal to 0.5 watt.

20. The method of claim 13, wherein the output laser beam has an average power greater than 1 watt.

* * * * *